United States Patent
Mickols et al.

(10) Patent No.: US 8,733,558 B2
(45) Date of Patent: May 27, 2014

(54) COMPOSITE MEMBRANE WITH COATING COMPRISING POLYALKYLENE OXIDE AND BIGUANIDE-TYPE COMPOUNDS

(75) Inventors: William E. Mickols, Chanhassen, MN (US); Chunming Zhang, Midland, MI (US); Christopher T. Hamilton, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 683 days.

(21) Appl. No.: 13/032,670

(22) Filed: Feb. 23, 2011

(65) Prior Publication Data

US 2011/0284458 A1    Nov. 24, 2011

Related U.S. Application Data

(60) Provisional application No. 61/347,469, filed on May 24, 2010.

(51) Int. Cl.
*B01D 39/00* (2006.01)
*B01D 39/14* (2006.01)
*B05B 5/00* (2006.01)
*B01D 67/00* (2006.01)

(52) U.S. Cl.
USPC ............... 210/500.38; 210/490; 210/500.27; 264/48; 427/244; 427/256

(58) Field of Classification Search
CPC .. B01D 67/0093; B01D 69/125; B01D 71/56; B01D 69/02
USPC ........ 210/500.38, 500.27, 490; 427/244–245; 264/48
See application file for complete search history.

(56) References Cited

U.S. PATENT DOCUMENTS

| | | | |
|---|---|---|---|
| 4,277,344 A | 7/1981 | Cadotte | |
| 4,765,897 A | 8/1988 | Cadotte et al. | |
| 4,833,014 A | 5/1989 | Linder et al. | |
| 4,872,984 A | 10/1989 | Tomaschke | |
| 4,888,116 A | 12/1989 | Cadotte et al. | |
| 4,909,943 A | 3/1990 | Fibiger et al. | |
| 4,911,844 A | 3/1990 | Linder et al. | |
| 4,964,998 A | 10/1990 | Cadotte et al. | |
| 4,981,497 A | 1/1991 | Hayes | |
| 4,983,291 A | 1/1991 | Chau et al. | |
| 5,178,766 A | 1/1993 | Ikeda et al. | |
| 5,614,099 A | 3/1997 | Hirose et al. | |
| 5,658,460 A | 8/1997 | Cadotte et al. | |
| 5,755,964 A | 5/1998 | Mickols | |
| 5,876,602 A | 3/1999 | Jons et al. | |
| 6,177,011 B1 | 1/2001 | Hachisuka et al. | |
| 6,280,853 B1 * | 8/2001 | Mickols | 428/474.4 |
| 6,878,278 B2 | 4/2005 | Mickols | |
| 6,913,694 B2 | 7/2005 | Koo et al. | |
| 7,279,097 B2 | 10/2007 | Tomioka et al. | |
| 7,490,725 B2 | 2/2009 | Pinnau et al. | |
| 7,491,334 B2 | 2/2009 | Comstock | |
| 7,537,697 B2 | 5/2009 | Koo et al. | |
| 7,641,054 B2 | 1/2010 | Sasaki et al. | |
| 7,815,987 B2 | 10/2010 | Mickols et al. | |
| 2005/0056589 A1 | 3/2005 | Hendel et al. | |
| 2006/0065598 A1 * | 3/2006 | Comstock | 210/639 |
| 2007/0009582 A1 | 1/2007 | Madsen et al. | |
| 2007/0039873 A1 | 2/2007 | Kurth et al. | |
| 2007/0039874 A1 | 2/2007 | Kniajanski et al. | |
| 2007/0039885 A1 | 2/2007 | Kurth et al. | |
| 2007/0175821 A1 | 8/2007 | Koo et al. | |
| 2007/0251883 A1 | 11/2007 | Niu | |
| 2007/0272607 A1 | 11/2007 | Kozlov et al. | |
| 2008/0185332 A1 | 8/2008 | Niu et al. | |
| 2008/0269417 A1 | 10/2008 | Belfer et al. | |
| 2009/0012208 A1 | 1/2009 | Madsen et al. | |
| 2009/0159527 A1 | 6/2009 | Mickols et al. | |
| 2009/0194479 A1 * | 8/2009 | Niu et al. | 210/638 |
| 2009/0220690 A1 * | 9/2009 | Niu et al. | 427/245 |
| 2011/0174720 A1 * | 7/2011 | Chen et al. | 210/323.1 |
| 2011/0259571 A1 * | 10/2011 | Yamasaki et al. | 165/185 |
| 2011/0284458 A1 * | 11/2011 | Mickols et al. | 210/500.38 |

FOREIGN PATENT DOCUMENTS

| | | |
|---|---|---|
| EP | 2072063 | 6/2009 |
| JP | 2009045595 | 3/2009 |
| KR | 1020050074167 | 4/2005 |

* cited by examiner

*Primary Examiner* — Ana Fortuna
(74) *Attorney, Agent, or Firm* — Edward W. Black

(57) ABSTRACT

Composite membranes including a coating of polyalkylene oxide and biguanide compounds along with various methods for making and using the same. In one embodiment, the composite membrane comprises a thin film polyamide layer including a coating of a reaction product of a polyalkylene oxide compound and a biguanide-type compound. In another embodiment, the coating comprises a polymer including alkylene oxide repeating units and one or more biguanide functional groups.

12 Claims, No Drawings

COMPOSITE MEMBRANE WITH COATING COMPRISING POLYALKYLENE OXIDE AND BIGUANIDE-TYPE COMPOUNDS

CROSS REFERENCE STATEMENT

This application claims the benefit of U.S. Provisional Application No. 61/347,469, filed May 24, 2010, the entire content of which is incorporated herein by reference.

BACKGROUND OF THE INVENTION

This invention generally relates to coatings for composite polyamide membranes. Polyamide membranes are commonly used in a variety of fluid separations. One particular class of such membranes include a microporous support with a "thin film" or "discriminating" polyamide layer which may formed by an interfacial reaction as described in U.S. Pat. No. 4,277,344 to Cadotte et al. The properties of such membranes may be modified by the addition of various additives, coatings and post-treatments as described in: U.S. Pat. No. 5,755,964; U.S. Pat. No. 6,878,278; and US 2009/0159527 to Mickols et al. and US 2008/0269417 to Belfer et al. Additional techniques include coating composite membranes with various polymers, e.g. polyoxazoline as described in US 2008/0185332 and US 2009/0194479 to Niu et al., poly(hexmethylenebiguanide) hydrochloride as described in U.S. Pat. No. 7,491,334 to Comstock, polyamide-polyether block copolymers as described in U.S. Pat. No. 7,490,725 to Pinnau et al. and various copolymers as described in US 2005/0056589 to Hendel et al. One interesting class of polymer coatings includes polyalkylene oxide compounds such as those described in U.S. Pat. No. 6,280,853 to Mickols, US 2007/0251883 and US 2009/0220690 to Niu et al. and U.S. Pat. No. 6,913,694 to Koo et al. Such polyalkylene oxide compounds may be combined with other polymers including polyoxazoline compounds as described in US 2008/0185332 and US 2009/0194479 to Niu et al. or polyacrylamide as described in U.S. Ser. No. 12/328,241 to Mickols. The entire content of each of the preceding references is incorporated herein by reference.

While coatings of polyalkylene oxide compounds have been shown to reduce fouling of composite polyamide membranes, further improvements in membrane performance are still desired.

BRIEF SUMMARY OF THE INVENTION

The invention includes composite membranes, methods for making and using the same and spiral wound modules including such membranes. The present invention includes many embodiments including methods involving contacting at least a portion of a surface of a polyamide layer with certain modifiers, including but not limited to combinations of polyalkylene oxide compounds and biguanide-type compounds. In one embodiment, the coating comprises a polymer including alkylene oxide repeating units and one or more biguanide functional groups. Many embodiments are disclosed including those which offer improved performance, e.g. improved solute rejection.

DETAILED DESCRIPTION OF THE INVENTION

The invention is not particularly limited to a specific type, construction or shape of composite membrane or application. For example, the present invention is applicable to flat sheet, tubular and hollow fiber polyamide membranes used in a variety of applications including reverse osmosis (RO), nano filtration (NF), ultra filtration (UF) and micro filtration (MF) fluid separations. However, the invention is particularly useful for modifying composite membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ions. NF composite membrane also typically reject particles in the nanometer range as well as organic molecules having molecular weights greater than approximately 200 to 500 Daltons.

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a microporous support having a typical thickness of about 25-125 microns and top layer (front side) comprising a thin film polyamide layer having a thickness typically less than about 1 micron, e.g. from 0.01 micron to 1 micron but more commonly from about 0.01 to 0.1 micron. The microporous support is typically a polymeric material having pore sizes which are of sufficient size to permit essentially unrestricted passage of permeate but not large enough so as to interfere with the bridging over of a thin polyamide membrane layer formed thereon. For example, the pore size of the support preferably ranges from about 0.001 to 0.5 micron. In some instances pore diameters larger than about 0.5 micron permit the polyamide layer to sag into the pores and disrupt a flat sheet configuration. Examples of microporous supports include those made of: polysulfone, polyether sulfone, polyimide, polyamide, polyetherimide, polyacrylonitrile, poly (methyl methacrylate), polyethylene, polypropylene, and various halogenated polymers such as polyvinylidene fluoride. The microporous support may also be made of other materials. For RO and NF applications, the microporous support provides strength but offers little resistance to fluid flow due to its relatively high porosity.

Due to its relative thinness, the polyamide layer is often described in terms of its coating coverage or loading upon the microporous support, e.g. from about 2 to 5000 mg of polyamide per square meter surface area of microporous support and more preferably from about 50 to 500 mg/m$^2$. The polyamide layer is preferably prepared by an interfacial polycondensation reaction between a polyfunctional amine monomer and a polyfunctional acyl halide monomer upon the surface of the microporous support as described in U.S. Pat. No. 4,277,344 to Cadotte et al and U.S. Pat. No. 6,878,278 to Mickols. More specifically, the polyamide membrane layer may be prepared by interfacially polymerizing a polyfunctional amine monomer with a polyfunctional acyl halide, (wherein each term is intended to refer both to the use of a single species or multiple species), on at least one surface of a microporous support. As used herein, the term "polyamide" refers to a polymer in which amide linkages (—C(O)NH—) occur along the molecular chain. The polyfunctional amine monomer and polyfunctional acyl halide are most commonly delivered to the microporous support by way of a coating step from solution, where the polyfunctional amine monomer is typically coated from an aqueous-based solution and the polyfunctional acyl halide from an organic-based solution. Although the coating steps need not follow a specific order, the polyfunctional amine monomer is preferably coated on the microporous support first followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer may have primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl) amine). Examples of preferred polyfunctional amine monomers include primary amines having two or three amino groups, for example, m-phenylene diamine, and secondary aliphatic amines having two amino groups such as piperazine. The polyfunctional amine monomer may be applied to the microporous support as an aqueous-based solution. The aqueous solution may contain from about 0.1 to about 20 weight percent and more preferably from about 0.5 to about 6 weight percent polyfunctional amine monomer. Once coated on the microporous support, excess aqueous solution may be optionally removed.

The polyfunctional acyl halide is preferably coated from an organic-based solution including a non-polar solvent. Alternatively, the polyfunctional acyl halide may be delivered from a vapor phase (e.g., for polyfunctional acyl halide species having sufficient vapor pressure). The polyfunctional acyl halide is preferably aromatic and contains at least two and preferably three acyl halide groups per molecule. Because of their lower cost and greater availability, chlorides are generally preferred over other halides such as bromides or iodides. One preferred polyfunctional acyl halide is trimesoyl chloride (TMC). The polyfunctional acyl halide may be dissolved in a non-polar solvent in a range from about 0.01 to 10 weight percent, preferably 0.05 to 3 weight percent, and may be delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred non-polar solvent is ISOPAR™ available from Exxon Chemical Company. The organic-based solution may also include small quantities of other materials.

Once brought into contact with one another, the polyfunctional acyl halide and the polyfunctional amine monomer react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed stream).

The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess water or organic solvent can be achieved by drying at elevated temperatures, e.g. from about 40° C. to about 120° C., although air drying at ambient temperatures may be used.

Flat sheet embodiments of such composite membranes are commonly used in spiral wound modules for RO and NF separations. Specific examples of commercially available spiral wound modules include: BW30-440i brackish water module, SW30-XLE-400i sea water desalination module and NF-400 nanofiltration module—all available from FilmTec Corporation, a subsidiary of The Dow Chemical Company.

The present invention encompasses many embodiments including methods involving contacting at least a portion of a surface of a polyamide layer of a composite membrane with a polyalkylene oxide compound and a biguanide-type compound. In a preferred embodiment, the polyalkylene oxide and biguanide-type compounds form a reaction product which is present upon at least a portion of the surface of the thin film polyamide layer. The term "reaction product" refers to a product resulting from a chemical reaction including the formation, rearrangement or destruction of a chemical bond. In a preferred embodiment, the term "reaction product" refers to product resulting from a chemical bond formed between two compounds. For example, in one embodiment the reaction product comprises a polyalkylene oxide compound chemically bonded to a biguanide-type compound. The method for forming the reaction product is not particularly limited. For example, the polyalkylene oxide may include a functional group which is capable of reacting with the biguanide-type compound to form a reaction product. Representative functional groups are described in more detail below; however groups which are capable of reacting under membrane manufacturing conditions (e.g. heating at temperatures from about 60 to 120° C.) are preferred. In another embodiment, a multifunctional "linking" compound such as a multifunctional epoxide compound (e.g. Bisphenol A diglycidyl ether) that includes multiple reactive functional groups may be combined and reacted with both the polyalkylene oxide and biguanide-type compounds in a manner such that the polyalkylene oxide and biguanide-type compounds become chemically linked and thereby form a reaction product. The reaction product may be formed prior to, during, or after the polyalkylene oxide and biguanide-type compounds are applied to the surface of the thin film polyamide layer. The reaction product is not a membrane per se but serves to modify the characteristics of the underlying the thin film polyamide layer. As will be described, the reaction product preferably reacts with the thin film polyamide layer, e.g. forms covalent bonds by reacting with amine, acid chloride or carboxylic acid groups present on the surface of the polyamide layer.

While term "polyalkylene oxide compound" and "biguanide-type compound" are each defined below, it will be understood that each term is intended to refer both to the use of a single species or multiple species.

The term "polyalkylene oxide compound" refers to a class of compounds comprising at least two repeating units comprising an ether-alkyl group wherein the alkyl group forming the backbone of the repeating unit comprises from 2 to 3 carbon atoms which may be unsubstituted or substituted. Non-limiting examples of applicable substituents groups include: hydroxyl, carboxylic acid, alkyl, and alkoxy wherein alkyl and alkoxy groups may be unsubstituted or substituted with substituents groups such as hydroxyl and epoxy. Specific examples include ethylene oxide and propylene oxide repeating units, (including combinations of ethylene oxide and propylene oxide repeating units). By way of non-limiting illustration, preferred embodiments of polyalkylene oxide compounds are represented by the repeating unit represented by Formula (I):

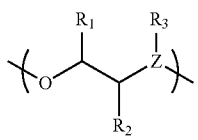

Formula (I)

wherein Z is a carbon atom or is not present; and $R_1$ $R_2$ and $R_3$ are not particularly limited but are preferably independently selected from the following: hydrogen; hydroxyl; carboxylic acid; alkyl group (preferably having 1 to 4 carbon atoms but more preferably 1 carbon atom) which may be unsubstituted or substituted with substituents groups such as: hydroxyl or epoxy; and alkoxy (preferably having from 1 to 4 carbon atoms) which may be unsubstituted or substituted with substituents groups such as hydroxyl or epoxy (e.g. ethyl oxide). It should be clear that when Z is not present, $R_3$ is also not present. By way of example, structures (I-A) and (I-B) illustrates an embodiment wherein Z is not present, i.e. the repeating unit only comprises two carbon atoms in the backbone) and $R_3$ is not present.

In preferred embodiments the number of repeating units represented by Formula (I) is from 2 to 20,000, but more preferably from 2 to 50. In several embodiments, the number of repeating units is preferably less than 25 (e.g. 2-24), and more preferably equal to or less than about 21 (e.g. 2-21). For most applications, preferred polyalkylene oxide compounds have a Mw (weight average molecular weight) equal to or less than about 5000 Daltons, but more preferably equal or less than about 1000 Daltons. In still other embodiments, the polyalkylene oxide compound has a Mw from about 100 to 2500 Daltons. In one class of embodiments, $R_1$ is hydrogen. In a preferred subset of embodiments, $R_1$ is hydrogen and $R_2$ and $R_3$ are independently selected from hydrogen or alkyl (substituted or unsubstituted as previously described). Additional representative examples are shown by Formulae (I-A) through (I-D).

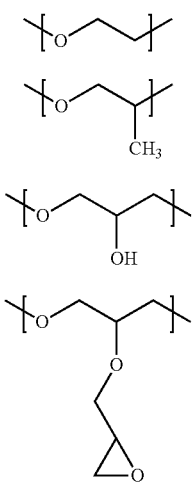

Formula (I-A)

Formula (I-B)

Formula (I-C)

Formula (I-D)

In addition to the repeating units of Formula (I), the subject polyalkylene oxide compounds include terminal portions or "end groups." One or more of such end groups may optionally include functional groups which are capable of reacting with the biguanide-type compound and optionally with functional groups present on the surface of the polyamide layer of the membrane. Non-limiting examples of such end groups include: acrylates, alkylenyls (e.g. vinyl, allyl), succinimidyl esters, succinimidyl amides, succinimidylimides, oxycarbonyldiimidazoles, azides, epoxides, aldehydes, sulfonates, isocyanates, sulfones (e.g. vinyl sulfone), nitrophenyl carbonates, trichlorophenyl carbonates, benzotriazole carbonates, silanes, anhydrides, amines, hydroxyl and thiols. Preferred end groups for reaction with the polyamide layer include epoxides, succinimidyl esters and isocyanates. Preferred end groups for reaction with biguanide-type compounds depend upon the nature of any substituent groups that may be present on the biguanide-type compound. For example, in embodiments where the biguanide-type compound includes a substituent group which serves as a leaving group (e.g. halogen, sulfoxide, sulfonate, etc.), a preferred end group for the polyalkylene oxide compounds includes hydroxyl and amino.

Such reactive end groups may be directly bonded to repeating units of the polymer, or may be optionally linked to the polymer by way of a "linking group" or "linking bond." The linking group or bond is not particularly limited and simple serves to chemically link the end group to a repeating unit of the polymer. Preferably, the linking group does not substantially interfere with the reactivity of the end group. Examples of representative linking groups or bonds are described in U.S. Pat. No. 6,280,853 and include: alkyl, ether, alkoxy, aryl, amine (preferably secondary amine), amide, urethane and sulfone groups. Additional examples of suitable polyalkylene oxide compounds include those described in US 2007/0251883; US 2008/0185332; U.S. Pat. No. 6,913,694 and US 2007/0175821.

The polyalkylene oxide compound may be linear, branched, comb, brush, star or dendritic, or include combinations of such species. Specific examples of preferred species include: polyethylene glycol, polyethylene glycol monoalkyl ethers, trimethylolpropane ethoxylate, pentaerythritol ethoxylate, and glycerol ethoxylate, polyethylene glycol monoglycidyl ether, poly(ethylene glycol) 2-aminoethyl methyl ether, polyethylene glycol mono(2-aminoethyl) ether, polyethylene glycol diamine, polyethylene glycol bis (3-aminopropyl)ether, polyethylene glycol diglycidyl ether; polyethylene glycol bis(2-chloroethyl)ether, polyethylene glycol bis(2-bromoethyl)ether, polyethylene glycol 2-chloroethyl methyl ether, polyethylene glycol 2-bromoethyl methyl ether, sulfonate of polyethylene glycol methyl ether and α,ω-disulfonate of polyethylene glycol. Examples of polyalkylene oxide compounds comprising repeating propylene oxide and ethylene oxide units includes JEFFAMINE™ polyetheramines available from Huntsman Corporation.

The polyalkylene oxide compounds are preferably water soluble, i.e. soluble at concentrations of at least about 0.1 wt %, preferably at least about 1 wt %, and even more preferably at least about 10 wt % at 25° C. and 101 kPa (1 atm).

The subject polyalkylene oxide compounds may, but need not, comprise homopolymers. For example, the subject polyalkylene oxide compounds preferably comprise equal to or more than about 50 mole percent, more preferably equal to or more than about 90 mole percent, still more preferably equal to or more than about 95 mole percent, more preferably equal to or more than about 98 mole percent and in some embodiments equal to or more than about 99 mole percent of the repeating units represented by Formula (I), based upon the total polymer composition.

For purposes of the present description, the term "biguanide-type compound" refers to a class of compounds represented by Formula (II):

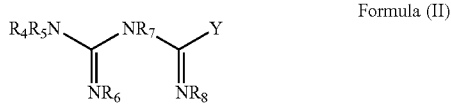

Formula (II)

wherein $R_4$, $R_5$, $R_6$, $R_7$ and $R_8$, are independently selected from: hydrogen; and aryl (e.g. phenyl), alicyclic (e.g. cyclohexyl) and aliphatic groups (e.g. alkyl or alkenyl) preferably having from 1 to 6 carbon atoms, wherein the aryl, alicyclic and aliphatic groups may be unsubstituted or substituted with substituents such as:

halogen (i.e. F, Cl, Br, I, but preferably Cl); hydroxyl; thiol (—SH); isocyanate; epoxide;

alkyl (preferably comprising from 1 to 6 carbon atoms which may be unsubstituted or substituted);

alkoxy ((—OR$_9$), wherein $R_9$ is an alkyl preferably comprising from 1 to 6 carbon atoms which may be unsubstituted or substituted;

aryl ((preferably phenyl) which may be unsubstituted or substituted);

aryl-oxy ((—O-aryl) wherein "aryl" (preferably phenyl) may be unsubstituted or substituted);

sulfone ((—SO$_2$R$_{10}$) wherein $R_{10}$ is an aryl or alkyl preferably comprising from 1 to 6 carbon atoms which may be unsubstituted or substituted);

sulfoxide ((—SOR$_{11}$) wherein $R_{11}$ is an aryl or alkyl preferably comprising from 1 to 6 carbon atoms which may be unsubstituted or substituted);

acyl (—C(O)R$_{12}$) wherein $R_{12}$ is alkyl preferably comprising from 1 to 6 carbon atoms which may be unsubstituted or substituted, or aryl which may be substituted or unsubstituted;

imine (—CR$_{13}$=NR$_{14}$); wherein $R_{13}$ and $R_{14}$ are independently selected from hydrogen, aryl and alkyl preferably comprising from 1 to 6 carbon atoms which may be unsubstituted or substituted; and amine ((—NR$_{15}$R$_{16}$) wherein $R_{15}$ and $R_{16}$ are independently selected from hydrogen, alkyl preferably comprising from 1 to 6 carbon atoms and aryl (preferably phenyl), and wherein at least one of $R_{15}$ and $R_{16}$ is preferably hydrogen).

Y is selected from: alkyl, alkoxy, aryl, aryl-oxy, imine, amine, halogen, sulfone and sulfoxide as described above; alkylthio (—SR$_{17}$ wherein $R_{17}$ is alkyl preferably comprising from 1 to 6 carbon atoms which may be unsubstituted or substituted); aryl-thio (—S-aryl); and a polymer including alkylene oxide repeating units as described in connection with Formula (I) that is linked via an amino group (e.g. —N(R$_{18}$)-polymer, wherein $R_{18}$ is preferably hydrogen or an alkyl having from 1 to 6 carbon atoms).

In a preferred subclass of embodiments, $R_4$, $R_5$, $R_6$, $R_7$ and $R_8$, are independently selected from: hydrogen; aryl (e.g. phenyl), alkyl comprising from 1 to 6 carbon atoms and acyl; and Y is selected from: alkyl, alkoxy, aryl, aryl-oxy, amine, alkylthio, aryl-thio, and halogen.

In each instance, "aliphatic," alicyclic," "alkyl," "alkenyl," "aryl," aryl-oxy," "alkoxy" and "phenyl" moieties may be unsubstituted or substituted with groups selected from: halogen, alkyl (preferably comprising from 1 to 6 carbon atoms), aryl (preferably phenyl), alkoxy (preferably comprising from 1 to 6 carbon atoms), thiol, sulfone, sulfoxide, epoxide, isocyanate, imine, and amine as described above, and further including sulfate, sulfonate and anhydride. "Alkyl" may be linear or branched. The subject biguanide-type compounds may be present in their free form or in salt form, e.g. as a hydrochloride salt, carbonate salt, nitrate salt or sulfate salt. A representative species of biguanide-type compound is shown in Formula (II-A):

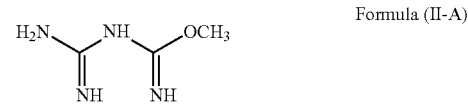

Formula (II-A)

One class of preferred embodiments comprise biguanide compounds wherein the term "biguanide compounds" refers to compounds represented by Formula (III):

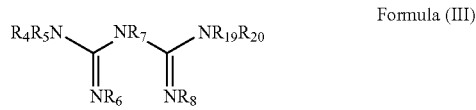

Formula (III)

wherein $R_4$, $R_5$, $R_6$, $R_2$ and $R_8$ are as previously defined and $R_{19}$ and $R_{20}$ are independently selected from the same groups as defined with respect to $R_4$, $R_5$, $R_6$, $R_2$ and $R_8$. In one subclass of preferred embodiments, $R_5$, $R_6$, $R_2$, $R_8$ and $R_{19}$ are each hydrogen. In another subclass of embodiments, $R_5$, $R_6$, $R_2$, $R_8$ and $R_{19}$ are each hydrogen and $R_4$ is selected from: hydrogen and alkyl groups having from 1 to 6 carbon atoms (e.g. methyl, ethyl, propyl, isopropyl and butyl), and $R_{15}$ is selected from: hydrogen; and aryl, alicyclic and aliphatic groups (e.g. alkyl or alkenyl) each having from 1 to 6 carbon atoms which may be unsubstituted or substituted with substituents described above. This subclass of compounds is generally represented by Formula III-A. A preferred species is biguanide (imidodicarbonimidic diamide), as represented by Formula III-B. Another representative species is represented by Formula III-C.

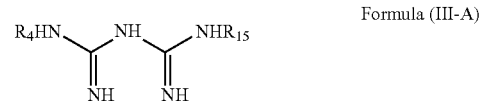

Formula (III-A)

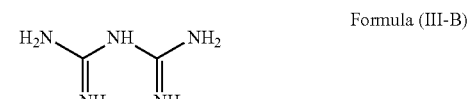

Formula (III-B)

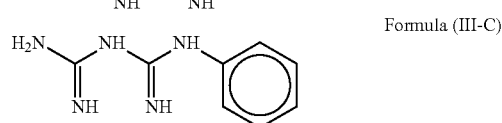

Formula (III-C)

Additional representative examples include: buformin (N-butylimidocarbonimidic diamide), phenformin (2-(N-phenethylcarbamimidoyl)biguanide) and metformin (N,N-dimethylimidodicarbon-imidic diamide).

The biguanide-type compounds (or their salts) are preferably water soluble, i.e. soluble at concentrations of at least about 0.1 wt %, preferably at least about 1 wt %, and even more preferably at least about 10 wt % at 25° C. and 101 kPa (1 atm).

In another embodiment, the polyalkylene oxide compound is reacted with a pro-biguanide compound (in its free or salt form), wherein the term "pro-biguanide" compound refers to a compound that forms a biguanide functional group upon reaction with the polyalkylene oxide compound. In this embodiment, the resulting reaction product is a polymer including alkylene oxide repeating units as described in connection with Formula (I) and one or more biguanide functional groups as represented by Formula (IV).

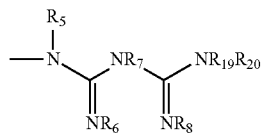

Formula (IV)

wherein $R_5$, $R_6$, $R_7$, $R_8$, $R_{19}$ and $R_{20}$ are as previously defined.

Examples of pro-biguanide compounds and corresponding reaction products are represented in the following reaction schemes.

Reaction Scheme I:

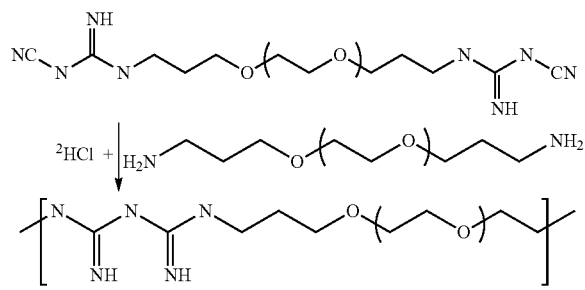

Reaction Scheme II:

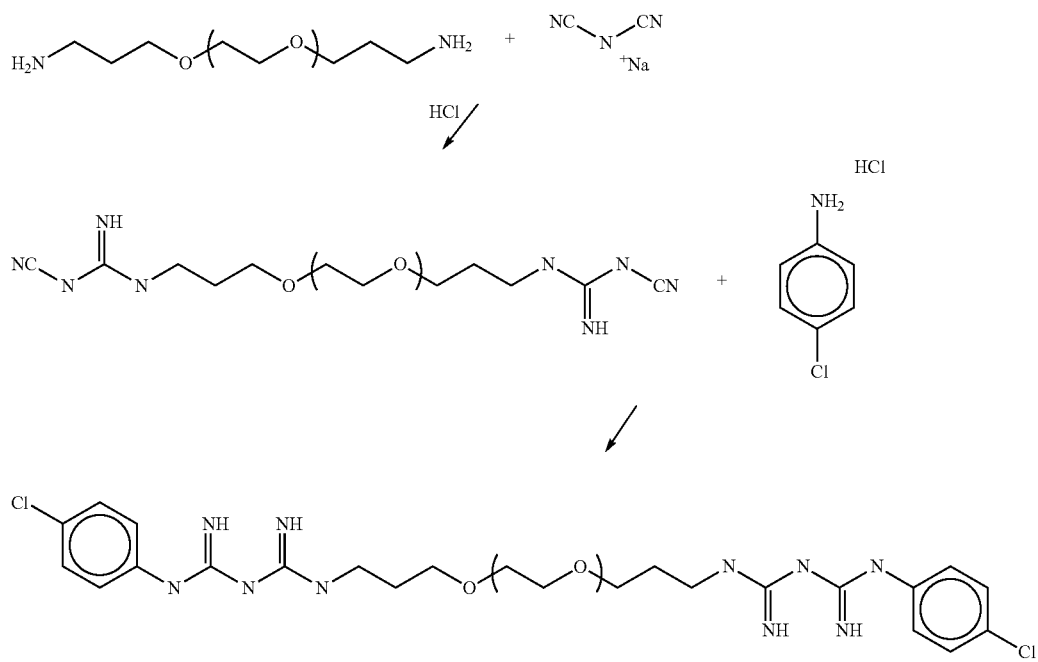

Reaction Scheme III:

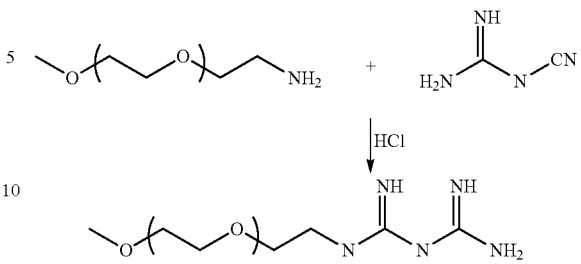

In one preferred embodiment, the subject method comprises the step of contacting a thin film polyamide layer of a composite membrane with a "modifier," as described below. Unless otherwise stated or otherwise clear from the context, the terms "modifier" and "modifiers" are intended to comprise a combination of a polyalkylene oxide compound and a biguanide-type compound. It should also be understood that the polyalkylene oxide and biguanide-type compounds may be combined with each other prior to contact with the polyamide layer, or may be independently contacted with the polyamide layer such as by way of sequential coating steps (e.g. via separate aqueous-based solutions). The subject method may be integrated into the method of making the composite membrane, e.g. during the actual formation of the thin film polyamide layer itself, or practiced after the formation of the composite membrane. For example, in one embodiment the subject method is part of a continuous membrane manufacturing process and is implemented just after formation of the composite membrane; whereas in other embodiments the composite membrane may be formed, stored and even used prior to treatment by the subject method. For example, in one embodiment the modifier (e.g. a reaction product of polyalkylene oxide and biguanide-type compounds) may be applied to the thin film polyamide layer by adding the modifier to a feed fluid which is passed by (in contact with) the composite membrane, e.g. after the membrane has been assembled into a module.

The step of "contacting" is intended to broadly describe any means of bringing the modifier into contact with the composite membrane. Similarly, the terms "applying" and "coating" are intended to broadly describe a wide variety of means of bringing the modifier into contact with at least a surface portion of the thin film polyamide layer such as by way of spraying, air knifing, rolling, sponging, coating, dipping, brushing or any other known means. One preferred application technique is to apply a thin coating of the modifier over at least a portion of the outer surface of the thin film polyamide layer by way of a roll contact coater, often referred to in the art as a "kiss" coater. The coating preferably covers at least 90% but more preferably the entire outer surface (i.e. the surface designed to contact feed fluid) of the polyamide layer at a loading of from about 1 to 500 mg of modifier per square meter of polyamide layer surface. Preferably, the coating operation results in a loading of modifier from about 2 to 50 mg/m$^2$ and more preferably from about 10 to 20 mg/m$^2$. In most embodiments the coating is very thin, e.g. less than about 1 micron and preferably less than or equal to 0.1 micron. The coating thickness is preferably greater than 0.001 micron. In one set of embodiments, the coating has a thickness from about 0.1 to 0.01 micron.

In one preferred embodiment the surface of the thin film polyamide layer of the composite membrane is coated with an aqueous-based solution derived from a combination of a polyalkylene oxide compound and a biguanide-type compound. The term "aqueous-based solution" refers to solutions wherein water is the majority solvent (by weight). In some embodiments, water comprises more than 50 wt % of the total solution. In other embodiments, water comprises at least 90 wt %, in some embodiments at least 95 wt % and in others at least 99 wt % based upon the total weight of the solution. The aqueous-based solution may comprise at least 0.001, preferably at least 0.01, and more preferably at least 0.1 weight percent of the modifier (wherein "modifier" constitutes the total quantity of both the polyalkylene oxide and biguanide-type compounds); and less than about 10, and more preferably less than about 1 weight percent of the modifier. In another embodiment the solution comprises from about 0.01 to 1, but preferably from 0.05 to 0.5 weight percent of the modifier. In a preferred sub-set of embodiments, the reaction product of polyalkylene oxide compound and biguanide-type compound is water soluble. The aqueous-based solution may also include other optional constituents including but not limited to co-solvents (e.g. alcohols) and additional modifiers including: oxazoline and thiazoline-based compounds, polymers and reaction products, e.g. polyoxazolines as described in US 2009/0194479; reaction products of polyalkylene oxides and polyacrylamides as described in U.S. Ser. No. 12/328,241; phenyl amine (aniline) compounds such as 3 or 4-chloro aniline and 3-aminothiophenol as described in US 2009/0159527; polyethylene glycol; and residual "carry over" from previous manufacturing steps. Such optional constituents are also preferably water soluble.

While a portion of the modifier typically penetrates the surface of the thin polyamide layer, the majority of the modifier resides on the surface upon which it is applied with little or no modifier penetrating through the thin film polyamide layer to its opposite surface. Thus, while the thin film polyamide layer is "modified", the effect is predominantly a surface phenomenon. As a consequence, the applied modifier is referred to herein as a "coating" but those skilled in the art will appreciate that the modifier is not necessarily limited to surface of the polyamide layer.

Once the modifier is contacted with at least a surface portion of the thin film polyamide layer, the resulting composite membrane may optionally be heated, such as by way of a convection air dryer or oven; however other heating means may be used, e.g. IR heaters, lamps, etc. While not particularly limited, the temperatures of such dryers or ovens are preferably designed to optimize manufacturing conditions, e.g. line speed, membrane chemistry, etc. In several preferred embodiments, the heating step involves passing the composite membrane through an oven or convection air dryer at air temperatures of from about 60 to 120° C., (in some embodiments from about 85 to 100° C.) for a few seconds (e.g. about 1 to 60 seconds) up to several minutes (e.g. 1 to 5 minutes) and even much longer in some embodiments (e.g. 1 to 24 hours). As will be described, the optional but preferred step of heating facilitates reaction between the biguanide-type and polyalkylene oxide compounds and optionally, reaction of the resulting reaction product with the polyamide layer of the composite membrane. Such a reaction between the reaction product and polyamide layer may result in a more robust coating which remains intact on the surface of the polyamide layer even after prolonged use and even routine cleaning.

The steps of "applying" the modifier and/or "heating" may be conducted concurrently but are preferably conducted sequentially. Moreover, the step of applying and/or heating may include multiple cycles, e.g. coating followed by heating followed by subsequent coating and heating. Furthermore, the step of heating may be utilized prior to the step of coating, particularly to remove residual fluids remaining after formation of the thin film polyamide layer.

As previously described, the subject modifier is preferably a reaction product of a polyalkylene oxide compound and a biguanide-type compound. The term "reaction product" refers to a product resulting from a chemical reaction including the formation, rearrangement or destruction of a chemical bond. By way of example, polyalkylene oxide compounds including reactive end groups (e.g. epoxides, isocyanates, azides, amines, etc.) react, particularly at increased temperature, with the subject biguanide-type compounds, as generally illustrated in Reaction Schemes IV-V.

Reaction Scheme IV:

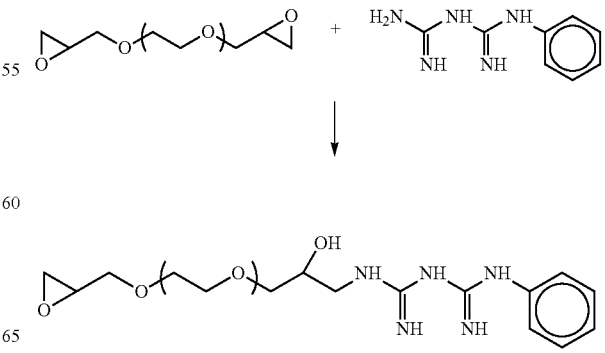

Reaction Scheme V:

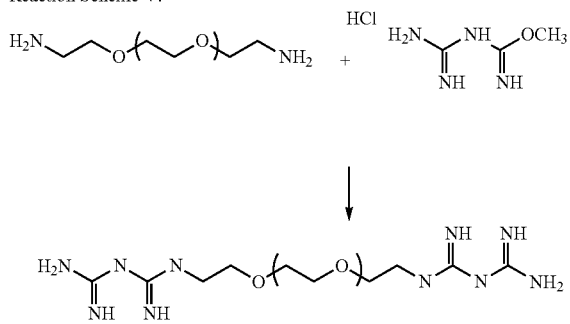

The subject biguanide-type compounds may be reacted with other compounds prior to, during or after the reaction with the subject polyalkylene oxide compounds. Examples of such compounds include: oxazoline and thiazoline-based compounds, polymers and reaction products, e.g. polyoxazolines as described in US 2009/0194479; polyacrylamides as described in U.S. Ser. No. 12/328,241; and phenyl amine (aniline) compounds such as 3-chloro aniline and 3-aminothiophenol as described in US 2009/0159527.

While such reaction products may form upon the polyamide layer after coating (e.g. facilitated by an optional heating/drying step), in preferred embodiments the reaction product is at least partially formed prior to or (and) during the step of contacting the surface of the polyamide layer with the combination of a polyalkylene oxide compound and a biguanide-type compound. While the reaction medium used to form the reaction product is not particularly limited, the reaction product is preferably formed by combining the polyalkylene oxide and biguanide-type compounds within an aqueous-based solution, which may be then used as a coating solution for applying the reaction product (i.e. "modifier") to the surface of the polyamide layer of the composite membrane. The aqueous-based coating solution may be prepared by combining a polyalkylene oxide compound and a biguanide-type compound in water, at a weight ratio of total modifier from about 0.001 to 50 wt % but preferably from about 0.01 to 1 wt % based on total solution weight. The molar ratio of polyalkylene oxide to biguanide-type compound is not particularly limited but is preferably a molar ratio from 10:1 to 1:10, but more preferably 5:1 to 1:5. In a preferred embodiment, the molar ratio reflects the relative number of reactive groups present in the polyalkylene oxide and biguanide-type compounds. For example, in one preferred set of embodiments, the polyalkylene oxide compound includes a plurality of reactive end groups (e.g. epoxides). In order to facilitate bonding between the reaction product and the polyamide layer, the stoichiometric ratio can be adjusted such that a portion of the reactive end groups of the polyalkylene oxide compound remain unreacted with each other, and as such are available to react with functional groups present on the polyamide layer.

The subject reaction product preferably binds, bonds or otherwise becomes associated with the polyamide layer, such as by way of the formation of covalent bonds or physically entanglement within (or interpenetration into) the polyamide layer, e.g. via chains of poly(alkylene oxide) becoming physically entangled with each other and with the polyamide layer of the composite membrane. In preferred embodiments, the subject modifier becomes chemically bound to the thin film polyamide layer. For example, in embodiments were the polyalkylene oxide compound includes reactive end groups, such as a hydroxyl, epoxide, isocyanates, azides, or sulfonates, such groups are believed to form covalent bonds with unreacted amines, acid chlorides, carboxylic acids and/or other groups of the polyamide membrane. The optional step of heating the composite membrane after being coated with the subject modifier is believed to further facilitate reaction between the individual components, e.g. covalent bonding of the biguanide-type compound with both the polyalkylene oxide compound and thin film polyamide layer. Such heating is also believed to remove residual water and lead to hydrogen bonding between the modifier and the thin film polyamide layer. By way of simple illustration, a proposed reaction product is represented by Formula (V)—showing a biguanide compound and a polyalkylene oxide compound (PAO) covalently bonded through an amine linkage (such as by reaction between an epoxy end group of the polyalkylene oxide compound with an amine group of the biguanide compound as represented in Reaction Scheme IV) and wherein the polyalkylene oxide compound is also covalently bonded to the surface of the polyamide layer (such as by way of reaction between an epoxide end group of the polyalkylene oxide compound with an amine or carboxylic acid group of the thin film polyamide layer).

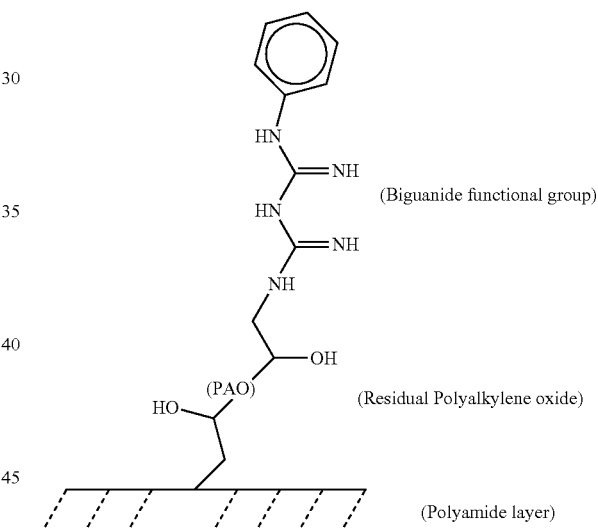

Formula (V)

The simplified reaction product of Formula (V) is provided for illustrative purposes only. Many other species of polyalkylene oxide compounds and biguanide compounds may be used. Moreover, the resulting coating preferably includes a more complex structure which may include multiple crosslinks along with hydrogen bonding, polymer chain entanglement and/or penetration into the polyamide membrane surface.

In preferred embodiments, the subject reaction product forms a hydrogel on the surface of the polyamide layer. The term "hydrogel" is intended to describe a water swellable three dimensional network of polymer chains that are water insoluble. That is, once formed, the hydrogel coating does not substantially dissolve when soaked or exposed to water.

The polyamide layer may optionally include hygroscopic polymers upon at least a portion of its surface. Such polymers include polymeric surfactants; polyacrylic acid; poly(oxazoline) compounds and reaction products of polyalkylene oxides with polymers such as polyacrylamides or poly(oxazolines) compounds as described in US 2008/0185332, US 2009/0194479 to Niu et al and U.S. Ser. No. 12/328,241 to Mickols. In some embodiments, such polymers may be blended and/or reacted with the subject modifiers and may be coated or otherwise applied to the polyamide membrane from a common solution, or applied sequentially. The optional use of such polymers, e.g. poly(oxazolines) compounds, may form hydrogels with the subject polyalkylene oxide compounds by way of hydrogen bonding and covalent binding.

While the subject polyalkylene oxide compounds preferably include reactive end groups, such reactive groups are not required. That is, in some embodiments a reaction product may be formed between the polyalkylene oxide and biguanide-type compounds by combining such compounds with a multifunctional "linking" compound including multiple reactive groups which react with both the polyalkylene oxide and biguanide-type compounds and provides a chemical linkage between them. For example, a polyfunctional epoxide compound (e.g. Bisphenol A diglycidyl ether) may be combined with, or separately coated upon the polyamide surface. Such a "linking" compound may serve as a chemical means for linking (binding) the subject polyalkylene oxide and biguanide-type compounds together to form the subject reaction product along with optionally binding the reaction product to the surface of the polyamide layer. Non-limiting examples of such multifunctional linking compounds include the polyfunctional epoxy compounds described in U.S. Pat. No. 6,913,694, e.g. reaction products of epichlorohydrin and a polyfunctional hydroxy, amino and/or amide compound such as: ethylene glycol, 1,3-propanediol, glycerol, trimethylolpropane, pentaerythritol, tris(hydroxymethyl)aminomethane, sorbitol, hydroquinone and Bisphenol. Additional non-limiting examples of multifunctional linking compounds include: 1,3 phenylene diidocyanate, 1,4 di-isocyanateobutane, glycerol diglycidyl ether, glycerol triglycidal ether, poly[(phenyl glycidal ether)-co-dicyclopentadiene] and 4-azidophenyl isothiocyanate.

By way of illustration, Reaction Scheme VI represents a reaction product formed from the reaction of a polyalkylene oxide compound (PAO-diamine), a biguanide compound (2-amino 1,3,5-biguanide) and a multifunctional linking compound (Bisphenol A diglycidyl ether).

Reaction Scheme VI:

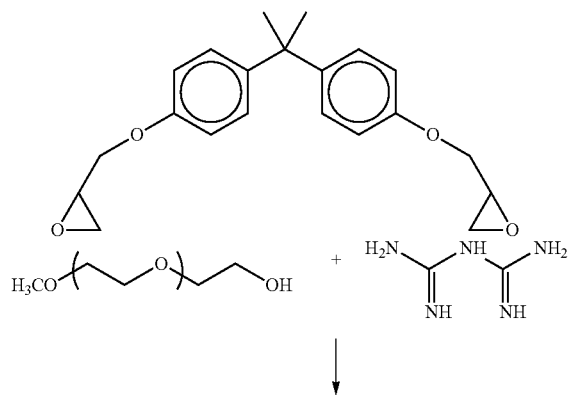

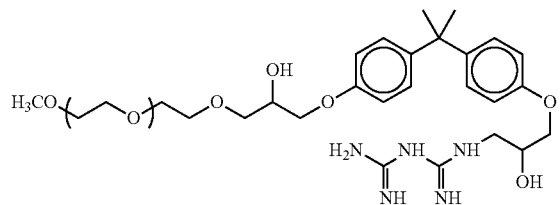

EXAMPLES

Experimental composite polyamide membranes were prepared on a pilot scale coating system by coating a microporous polysulfone support including non-woven fabric backing with an aqueous solution of m-phenylenediamine (MPD) (MPD concentration of approximately 3 wt %). The resulting support was then drained to remove excess aqueous solution and was subsequently coated with a solution of trimesoyl chloride (TMC) in ISOPAR™ L (Exxon Corp.) (TMC concentration of approximately 0.1 wt/vol %) to produce a thin film polyamide layer upon the microporous support. After formation of the thin film polyamide layer, the composite polyamide membranes were passed through a water bath at room temperature followed by a subsequent water bath containing 3.5 wt % glycerin at approximately 95° C. The membranes were then passed through a convection air dryer at approximately 95° C. for approximately 24 seconds. The thin film polyamide layers of each composite membrane were then coated via a contact coater with one of the aqueous-based coating solutions listed in Table I. Once coated, the polyamide composite membranes were passed through a second convection air dryer at approximately 100° C. for approximately 24 seconds and subsequently tested using an aqueous test solution comprising: approximately 2,000 ppm sodium chloride, 5 ppm boric acid, 150 ppm sodium nitrate, 150 ppm sodium meta silicate, and 150 ppm isopropyl alcohol (IPA) maintained at an approximate pH of 8, a temperature of approximately 25° C., and a transmembrane pressure of 225 psi (approx. 1.55 MPascals). Flux (rate of permeate transported per unit of membrane area) and solute passage values were measured for each membrane and are reported below. At least three sample coupons of each membrane were tested.

"PBG" refers to 1-phenylbiguanide, obtained from Sigma-Aldrich Company (Catalog no. 164216; CAS Number: 102-02-3). "PEG biguanide" refers to O,O'-bis{3-[3-(4-chlorophenylcarbamimidoyl)guanidino]propyl}polyethylene glycol, the reaction product represented in Reaction Scheme II. "PEGDE" refers to poly(ethylene glycol) diglycidyl ether having an approximate Mn of 526, obtained from Sigma-Aldrich Company (Catalog no. 475696; CAS Number: 72207-80-8). "PEOX" refers to poly 2-ethyl 2-oxazoline having an approximate Mw (weight average molecule weight) of 500,000 obtained from Sigma-Aldrich Company.

TABLE I

| Coating Solution (wt %) | | Flux (gfd) | Solute Passage (%) | | | | |
| --- | --- | --- | --- | --- | --- | --- | --- |
| | | | Na | Cl | NO$_3$ | Boric acid | IPA |
| No coating (control) | Avg. | 42.25 | 0.741 | 0.532 | 3.057 | 26.503 | 6.226 |
| | Std Dv | 0.56 | 0.063 | 0.048 | 0.180 | 1.533 | 0.286 |
| 0.04% PBG | Avg. | 45.00 | 0.764 | 0.550 | 3.109 | 26.015 | 6.369 |
| | Std Dev | 1.64 | 0.031 | 0.025 | 0.136 | 1.428 | 0.211 |
| 0.07% PEGDE | Avg. | 35.15 | 0.560 | 0.412 | 2.306 | 23.948 | 5.434 |
| | Std Dev | 1.27 | 0.015 | 0.013 | 0.174 | 1.320 | 0.576 |
| 0.07% PEG biguanide | Avg. | 25.13 | 0.357 | 0.263 | 1.565 | 17.317 | 3.096 |
| | Std Dev | 0.42 | 0.013 | 0.009 | 0.097 | 0.330 | 0.291 |
| 0.07% PEG biguanide 0.07% PEOX | Avg. Std Dev | 21.87 0.50 | 0.257 0.012 | 0.194 0.010 | 1.074 0.114 | 15.822 0.716 | 2.677 0.488 |

As demonstrated by the data provided in Table I, experimental composite polyamide membranes coated with reaction products of polyalkylene oxide and biguanide compounds showed lower solute passages as compared with membranes coated with a comparable polyalkylene oxide compound or biguanide compounds.

While not limited to a particular type of polyamide membrane, the subject invention is particularly suited for application to composite membranes such as those commonly used in RO and NF applications, and more particularly to flat sheet composite polyamide membranes used in RO and NF applications. As previously described, such membranes include a microporous support and a thin film polyamide layer which may be coated with the subject modifier(s). In such embodiments, the subject coating does not form a membrane itself but rather modifies the performance of the thin film polyamide layer. That is, the polyamide layer serves as the primary discriminating component of the composite membrane with the microporous support providing support for the polyamide layer but offering little resistance to permeate flow and the subject coating modifying the performance characteristics of the thin film polyamide layer.

Polyamide chemistries are typically optimized for specific applications such as RO desalination, RO brackish water, and NF applications. While such membranes may be based upon FT-30 type chemistries (e.g. MPD & TMC interfacial polymerization), the amounts and ratios of constituents typically varies in order to optimize performance for a particular application. Moreover, additives (as described in U.S. Pat. No. 6,878,278) are often utilized to further optimize or customize performance of the underlying polyamide layer for a specific application. While the specific chemistry involved in the formation of the thin film polyamide layer will impact final membrane performance, (e.g. flux, solute passage, etc.), the described examples are intended to demonstrate relative improvement resulting from the subject coating which is largely independent of the underlying polyamide chemistry.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

The invention claimed is:

1. A composite membrane comprising a microporous support, a thin film polyamide layer and a coating covalently bonded to a surface portion of the thin film polyamide layer, wherein the coating comprises a polymer comprising alkylene oxide repeating units and at least one end group comprising a biguanide functional group represented by Formula (IV):

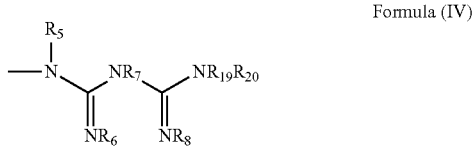

Formula (IV)

wherein R$_5$, R$_6$, R$_7$, R$_8$, R$_{19}$ and R$_{20}$ are independently selected from: hydrogen, aryl, alicyclic and aliphatic groups.

2. The membrane of claim 1 wherein R$_5$, R$_6$, R$_7$, R$_8$, R$_{19}$ and R$_{20}$ are independently selected from: hydrogen, alkyl and aryl.

3. The membrane of claim 2 wherein R$_5$, R$_6$, R$_7$, R$_8$ and R$_{19}$ are each hydrogen.

4. The membrane of claim 1 the alkylene oxide repeating units are represented by Formula (I):

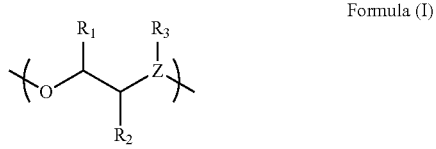

Formula (I)

wherein Z is a carbon atom or not present, and R$_1$, R$_2$ and R$_3$ are independently selected from: hydrogen, hydroxyl, carboxylic acid, alkyl and alkoxy.

5. The membrane of claim 1 wherein the coating further comprises a poly(oxazoline) compound.

6. A composite membrane comprising a microporous support, a thin film polyamide layer and a coating covalently bonded to a surface portion of the thin film polyamide layer, wherein the coating comprises a reaction product of a i) polyalkylene oxide compound comprising alkylene oxide repeating units and a reactive end group and ii) a biguanide-type compound reactive with said end group wherein the biguanide-type compound is represented in Formula (II):

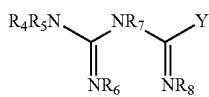

Formula (II)

wherein $R_4$, $R_5$, $R_6$, $R_7$ and $R_8$, are independently selected from: hydrogen, aryl, alicyclic and aliphatic groups; and Y is selected from: alkyl, alkoxy, alkylthio, aryl, aryloxy, aryl-thio, imine, amine, halogen, sulfone, and sulfoxide, or a polymer including alkylene oxide repeating units linked by an amino group.

7. The membrane of claim 6 wherein the biguanide-type compound is represented by Formula (III):

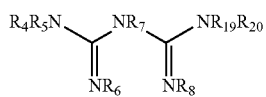

Formula (III)

wherein $R_4$, $R_5$, $R_6$, $R_7$, $R_8$, $R_{19}$ and $R_{20}$ are independently selected from: hydrogen, aryl, alicyclic and aliphatic groups.

8. The membrane of claim 7 wherein $R_4$, $R_5$, $R_6$, $R_7$, $R_8$, $R_{19}$ and $R_{20}$ are independently selected from hydrogen, aryl and alkyl.

9. The membrane of claim 6 wherein the coating comprises a reaction product of a polyalkylene oxide compound, a biguanide compound and a poly(oxazoline) compound.

10. A method of modifying a composite membrane comprising a microporous support and a thin film polyamide layer comprising the step of coating at least a portion of a surface of the thin film polyamide layer with at least one of:

A) a reaction product of i) a polyalkylene oxide compound comprising alkylene oxide repeating units and a reactive end group and ii) a biguanide-type compound reactive with said end group wherein the biguanide-type compound is represented in Formula (II):

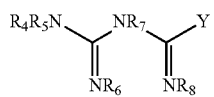

Formula (II)

wherein $R_4$, $R_5$, $R_6$, $R_7$ and $R_8$, are independently selected from: hydrogen, aryl, alicyclic and aliphatic groups; and Y is selected from: alkyl, alkoxy, alkylthio, aryl, aryloxy, aryl-thio, imine, amine, halogen, sulfone, and sulfoxide; and B) a polymer comprising alkylene oxide repeating units and at least one end group comprising a biguanide functional group represented by Formula (IV):

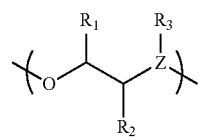

Formula (I)

wherein $R_5$, $R_6$, $R_7$, $R_8$, $R_{19}$ and $R_{20}$ are independently selected from: hydrogen, aryl, alicyclic and aliphatic groups.

11. The method of claim 10 wherein the coating comprises an aqueous-based solution.

12. The method of claim 10 wherein the coating further comprises a poly(oxazoline) compound.

* * * * *